(12) United States Patent
Lee

(10) Patent No.: US 11,348,263 B2
(45) Date of Patent: May 31, 2022

(54) TRAINING METHOD FOR DETECTING VANISHING POINT AND METHOD AND APPARATUS FOR DETECTING VANISHING POINT

(71) Applicant: SAMSUNG ELECTRONICS CO., LTD., Suwon-si (KR)

(72) Inventor: Sang Jun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 16/509,033

(22) Filed: Jul. 11, 2019

(65) Prior Publication Data

US 2020/0126244 A1 Apr. 23, 2020

(30) Foreign Application Priority Data

Oct. 23, 2018 (KR) .................. 10-2018-0126560

(51) Int. Cl.
*G06T 7/536* (2017.01)
*G06T 3/60* (2006.01)
*G06T 7/73* (2017.01)

(52) U.S. Cl.
CPC ............... *G06T 7/536* (2017.01); *G06T 3/60* (2013.01); *G06T 7/73* (2017.01); *G06T 2207/20076* (2013.01); *G06T 2207/20081* (2013.01); *G06T 2207/20084* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,778,699 B1 | 8/2004 | Gallagher | |
| 6,968,094 B1 | 11/2005 | Gallagher | |
| 8,396,299 B2 | 3/2013 | Sakurai | |
| 9,311,719 B2 | 4/2016 | Lee et al. | |
| 9,357,208 B2 | 5/2016 | Gupta et al. | |

(Continued)

FOREIGN PATENT DOCUMENTS

| | | |
|---|---|---|
| EP | 3582142 | * 12/2019 |
| GN | 102609938 A | 7/2012 |

(Continued)

OTHER PUBLICATIONS

Yan Shuai et al. "Regression Convolutional Network for Vanishing Point Detection" Automation (YAC), 32nd Youth Academic Annual Conference of Chinese Association of. IEEE, 2017 (pp. 634-638).

(Continued)

*Primary Examiner* — Nancy Bitar
(74) *Attorney, Agent, or Firm* — Sughrue Mion, PLLC

(57) ABSTRACT

Provided is a method and apparatus for detecting a vanishing point in a driving image of a vehicle. The method includes: receiving the driving image; generating a probability map, comprising probability information about a position of the vanishing point in the driving image, from the driving image; detecting a vanishing point on the driving image by applying smoothing regression, which softens a boundary region of the vanishing point, to the probability map; and processing a task for driving the vehicle by converting an orientation of the driving image based on the vanishing point.

17 Claims, 12 Drawing Sheets

(56) References Cited

U.S. PATENT DOCUMENTS

| | | | |
|---|---|---|---|
| 9,729,787 B2 | 8/2017 | Shechtman et al. | |
| 2011/0115912 A1 | 5/2011 | Kuehnle | |
| 2012/0141015 A1 | 6/2012 | Yu et al. | |
| 2014/0270479 A1* | 9/2014 | Berestov | G06T 7/13 |
| | | | 382/154 |
| 2017/0308770 A1 | 10/2017 | Jetley et al. | |
| 2018/0056873 A1 | 3/2018 | Lee | |
| 2019/0156128 A1* | 5/2019 | Zhang | G08G 1/167 |
| 2019/0220685 A1* | 7/2019 | Uchiyama | G06K 9/00362 |

FOREIGN PATENT DOCUMENTS

| | | |
|---|---|---|
| JP | 08-159716 A | 6/1996 |
| KR | 10-0948872 B1 | 3/2010 |
| KR | 10-2014-0045854 A | 4/2014 |
| KR | 10-2015-0112656 A | 10/2015 |
| KR | 10-2017-0133085 A | 12/2017 |
| KR | 10-2018-0024783 A | 3/2018 |
| KR | 10-2018-0048407 A | 5/2018 |
| KR | 10-1863196 B1 | 6/2018 |
| WO | 2009027090 A2 | 3/2009 |
| WO | WO2019238976 * | 12/2019 |

OTHER PUBLICATIONS

Seokju Lee, et al., "VPG Net: Vanishing Point Guided Network for Lane and Road Marking Detection and Recognition", Oct. 17, 2017, IEEE International Conference on Computer Vision (ICCV), (10 pages total).

Jonathan Long et al., "Fully Convolutional Networks for Semantic Segmentation", Mar. 8, 2015, Computer Vision and Pattern Recognition (CVPR), (11 pages total).

* cited by examiner

FIG. 9
Sample image
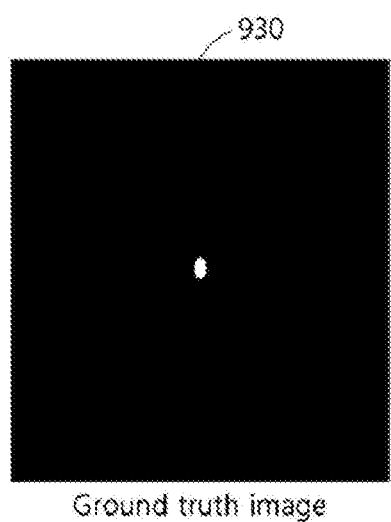
Ground truth image

TRAINING METHOD FOR DETECTING VANISHING POINT AND METHOD AND APPARATUS FOR DETECTING VANISHING POINT

CROSS-REFERENCE TO THE RELATED APPLICATION

This application claims priority from Korean Patent Application No. 10-2018-0126560, filed on Oct. 23, 2018, in the Korean Intellectual Property Office, the disclosure of which is incorporated herein in its entirety by reference.

BACKGROUND

The following embodiments of the inventive concept relate to a training method for detecting a vanishing point, and a method and apparatus for detecting the vanishing point.

In an autonomous navigation system, an image obtained from a camera sensor at the front of a vehicle is converted to a top-view image, and road line or lane information displayed on the top-view image is used to determine a traveling route. Converting the image into the top-view image may be performed by using calibration parameters including a pitch of the camera. However, the pitch of the camera may be changed depending on various factors such as change in the number of occupants in the vehicle, change of an angle of installation of the camera. When the pitch of the camera is changed, the position of a vanishing point identified in the image also changes. In this case, it is difficult to accurately convert the image into the top-view image.

SUMMARY

Various example embodiments of the inventive concept provide a method and apparatus for detecting a vanishing point in a driving image of a vehicle.

The embodiments also provide a training method and apparatus for training a neural network used for detecting the vanishing point in the driving image of the vehicle.

According to an aspect of the embodiment, there is provided a method of detecting a vanishing point in a driving image of a vehicle, which may include: receiving the driving image; generating a probability map, comprising probability information about a position of the vanishing point in the driving image, from the driving image; detecting a vanishing point on the driving image by applying smoothing regression, which softens a boundary region of the vanishing point, to the probability map; and processing a task for driving the vehicle by converting an orientation of the driving image based on the vanishing point.

According to an aspect of the embodiment, there is provided a training method for training a neural network which may include: receiving a training image and training data comprising a label indicating a vanishing point in the training image; training, based on the training image and the label, a first neural network to output first probability information about the vanishing point; generating a probability map in which a boundary of the vanishing point is softened; and training, based on the training image and the probability map, a second neural network to detect the vanishing point.

According to an aspect of the embodiment, there is provided an apparatus for detecting a vanishing point in a driving image of a vehicle. The apparatus may include: a sensor configured to detect the driving image of the vehicle; and a processor configured to: generate a probability map, comprising probability information about a position of the vanishing point in the driving image, from the driving image by using a neural network; apply smoothing factor-based regression, which softens a boundary region of the vanishing point, to the probability map to detect a vanishing point on the driving image; and convert an orientation of the driving image based on the vanishing point.

BRIEF DESCRIPTION OF THE DRAWINGS

The embodiments of the inventive concept will be more clearly understood from the following detailed description taken in conjunction with the accompanying drawings, in which:

FIG. 9 shows images used for training a first neural network according to an embodiment;

DETAILED DESCRIPTION OF THE EMBODIMENTS

Figure 1:
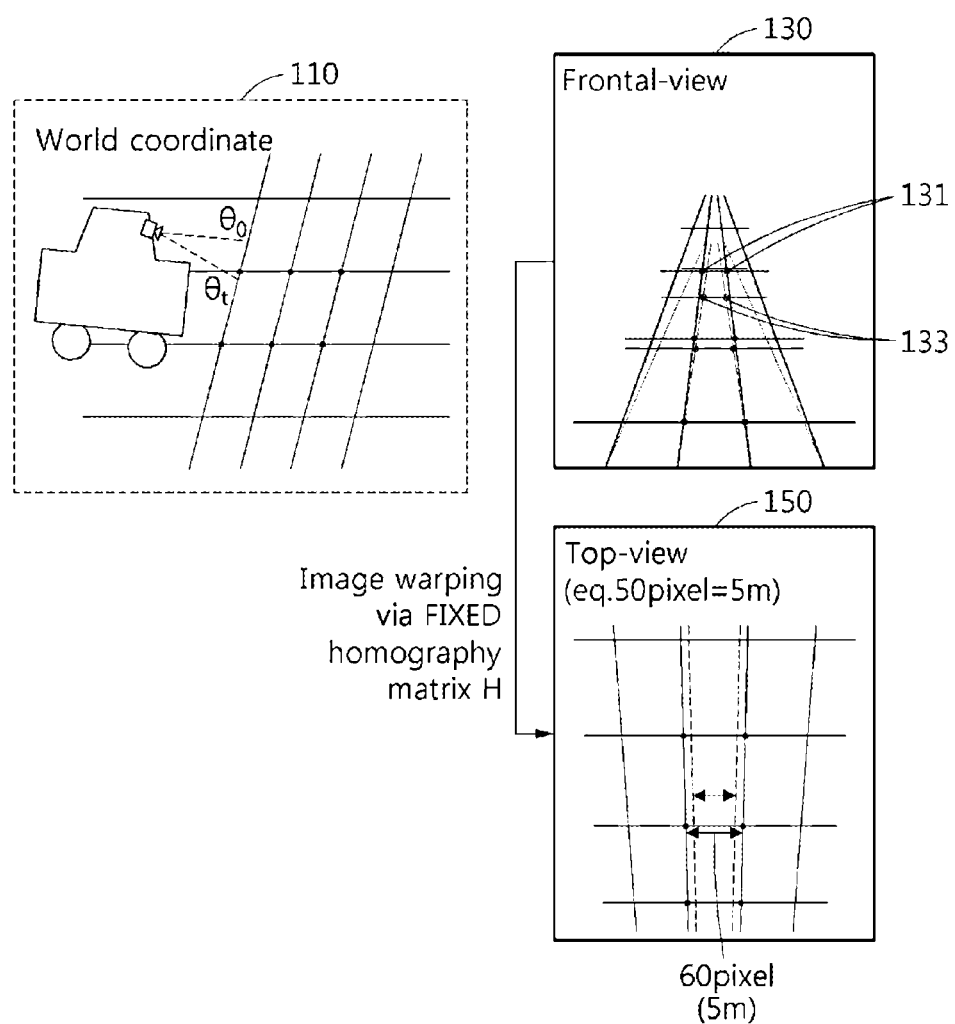
FIG. 1 shows a diagram for explaining a case in which a pitch of a camera mounted on a vehicle is changed.

The structural or functional descriptions disclosed herein are provided for illustrative purposes only to explain embodiments of the inventive concepts. The disclosed embodiments are all exemplary, which may be modified and implemented in various other forms, and the scope of the inventive concept is not limited to these embodiments.

An embodiment provided in the following description is not excluded from being associated with one or more features of another example or another embodiment also provided herein or not provided herein but consistent with the inventive concept. For example, even if matters described in a specific example are not described in a different example thereto, the matters may be understood as being related to or combined with the different example, unless otherwise mentioned in descriptions thereof.

The embodiments to be described below may be used to display lanes and to generate visual information for assisting steering of an autonomous vehicle, in an augmented reality navigation system such as a smart vehicle. In addition, the embodiments may be used for assisting safe and comfortable driving by interpreting visual information in a device including an intelligent system such as a head up display (HUD) installed for driving assistance in a vehicle or a fully autonomous driving. Embodiments may be applied to, for example, autonomous vehicles, intelligent vehicles, smart phones, and mobile devices. Hereinafter, the embodiments will be described in detail with reference to the accompanying drawings. Like reference numerals in the drawings denote like elements.

FIG. 1 shows a diagram for explaining a case in which a pitch of a camera mounted on a vehicle is changed. FIG. 1 shows how the change in the pitch of the camera affects a front-view image 130 and a top-view image 150 when the pitch of the camera changes from $\theta_0$ to $\theta_t$.

The pitch of the camera fixedly mounted on the vehicle may indicate an amount of inclination of the vehicle or an altitude of the vehicle with respect to the ground. For example, when occupants of the vehicle on which the camera is mounted are mainly seated on a front or back side of the vehicle, and thus, the center of gravity of the vehicle changes, or when an image is captured when the vehicle is on a speed bump or other bumps, the pitch of the camera may change.

Due to this change in the pitch of the camera (change from $\theta_0$ to $\theta_t$), for example, positions of vertices on vanishing lines toward a vanishing point on the front-view image 130 may change from 131 to 133 as shown in FIG. 1. Here, the "vanishing point" is a point in which parallel straight lines in three-dimensional space meet when the parallel straight lines are displayed on a two-dimensional image. Examples of the vanishing point include a point at which railway tracks or parallel road lines on a road meet on an image. Since the parallel straight lines do not actually meet, the vanishing point may correspond to a virtual point appearing on the image, not an actual intersection point.

As the positions of the points on the vanishing lines change on the front-view image 130, the position of the vanishing point on the front-view image 130 may also change. In addition, when the front-view image 130 is converted to the top-view image 150 by using a fixed homography matrix, a position of an object and/or a distance of the object from the vehicle on the top-view image 150 may also change.

Accordingly, when the situation change, such as a seating change in the vehicle or a change of an image capturing position, is not reflected on the pitch of the initially mounted camera, it is not easy to accurately locate the vanishing point and to generate an accurate top-view image.

Figure 2:
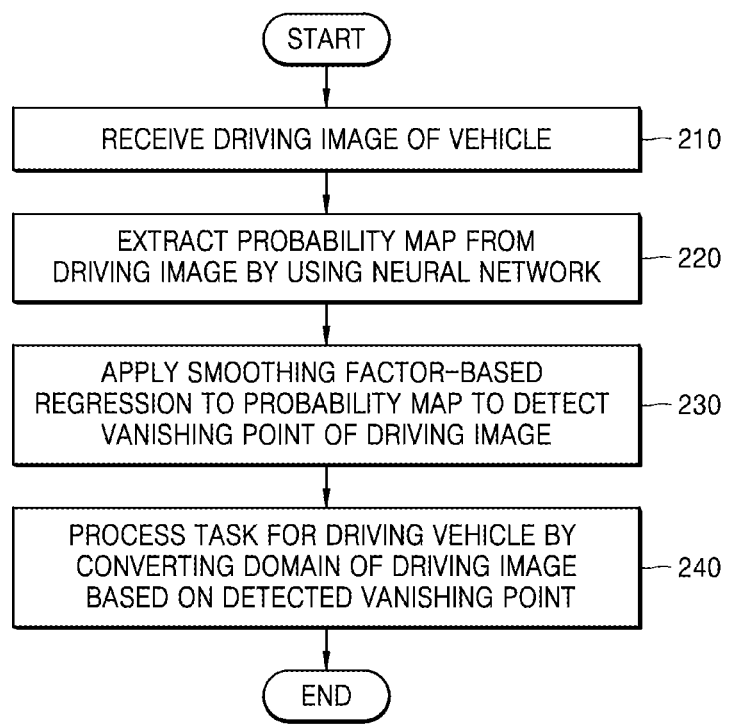
FIG. 2 shows a flowchart illustrating a method of detecting a vanishing point according to an embodiment.

FIG. 2 shows a flowchart illustrating a method of detecting a vanishing point according to an embodiment. Here, the vanishing point detected by the method illustrated in FIG. 2 may be a vanishing point on a front- or side-view image of a vehicle which is changed by variation of a pitch of a camera fixedly mounted on the vehicle while the vehicle is being driven.

In operation 210, an apparatus for detecting a vanishing point (hereinafter referred to as 'detecting apparatus') according to an embodiment receives a driving image of a vehicle. The driving image may be an image of a front view of the vehicle. The driving image may be obtained through a camera that is mounted on the vehicle at the time of driving the vehicle and configured to capture the front view and/or a side view of the vehicle. In one embodiment, the driving image may be an external image of the front view of the vehicle received from the outside of the detecting apparatus through a communication interface (see a communication interface 1170 in FIG. 11). The driving image may be, for example, a two-dimensional (2D) driving image or a three-dimensional (3D) driving image. The driving image may include a road image including a surrounding vehicle, a lane, a curb, a sidewalk, and a surrounding environment, and/or a road surface image. The driving image may be a color image. The driving image may also include various images such as an infrared image, a depth image, and a stereo image. The driving image may include one frame or a plurality of frames.

In operation 220, the detecting apparatus generates a probability map from the driving image by using a neural network. The neural network may be, for example, a fully convolutional network (FCN). The neural network may be trained (learned) based on, for example, a loss between the probability map corresponding to probability information about a vanishing point and probability distribution of the vanishing point included in the driving image. The training method of the neural network will be described in detail with reference to FIGS. 5 to 10 below. In addition, the probability map may correspond to or indicate the probability information about the vanishing point of which a boundary region has been softened on the driving image. The probability map may include probability information in dimensions, for example, information about whether pixels included in the driving image are positioned a first region corresponding to the vanishing point, a second region not corresponding to the vanishing point, or a third region corresponding to a boundary between the first region and the second region.

In operation 230, the detecting apparatus detects the vanishing point of the driving image by applying smoothing factor-based regression to the probability map. The detecting apparatus may apply the smoothing factor-based regression to the probability map, for example, by applying Equation 1 below to the probability map to obtain p(x, y) corresponding to the vanishing point.

$$p(x, y) = \frac{\exp(l(x, y, k)/T)}{\sum_{k=1}^{K} \exp(l(x, y, k)/T)}, \quad (1)$$

where T (temperate) represents a smoothing factor, l(x, y, k) represents a logit corresponding to an output of the neural network, x represents a horizontal length of the driving image, y represents a vertical length of the driving image, and k represents a depth, and may correspond to, for example, the number of classes of objects to be recognized.

The smoothing factor T may be a value greater than 1, for example, 5 or 10. As the smoothing factor T increases, probability responses that are around only 0 or 1 in the probability map may be spread between 0 and 1. The smoothing factor T may soften a boundary of category or class information arbitrarily assigned by a user.

In an embodiment, by softening the boundary of the probability map that classifies classes by using the smoothing factor T, for example, even when some lane components such as an edge or a line segment is not detected in the driving image, or correct answer data for the vanishing point is marked as being slightly shifted, an object may be easily detected from the softened boundary of classes.

In operation 230, the detecting apparatus may determine the centroid of a candidate region for the vanishing point according to a result of the smoothing factor-based regression, and determine the centroid of gravity as the vanishing point.

In operation 240, the detecting apparatus processes a task for driving the vehicle by converting a domain of the driving image based on the detected vanishing point. For example, the detecting apparatus may determine a pitch variation based on the vanishing point, and update (or correct) a transformation matrix based on the pitch variation. The transformation matrix may be, for example, a homography matrix. The detecting apparatus may convert the domain of the driving image based on the updated transformation matrix. The detecting apparatus may convert the domain of the driving image into a domain of the top-view image. Here, the task for driving the vehicle may be at least one of, for example, determination of a driving parameter and generation of a driving assistant image.

A method of converting the domain of the driving image by the detecting apparatus according to an embodiment will be described in detail with reference to FIG. 3.

Figure 3:
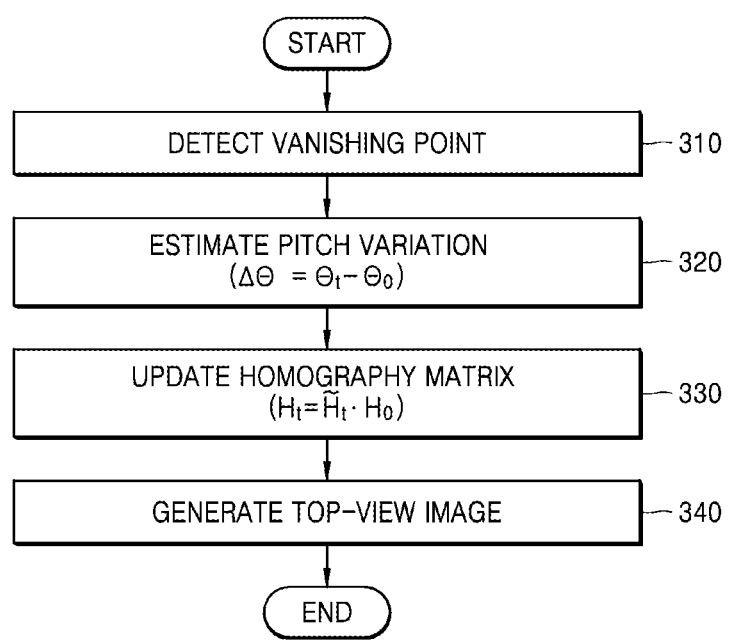
FIG. 3 shows a flow diagram illustrating a method of generating a top-view image according to an embodiment.

FIG. 3 shows a flow diagram illustrating a method of generating a top-view image according to an embodiment.

In operation 310, the detecting apparatus according to an embodiment detects the vanishing point from the driving image based on the neural network as described above. For example, the detecting apparatus may detect a vanishing point having a position $v_t=(v_{t,x},v_{t,y})$ at time point t by using the neural network.

In operation 320, the detecting apparatus estimates a pitch variation based on the detected vanishing point. For example, the detecting apparatus may estimate a pitch variation $\Delta\theta_t$ between an initial pitch $\theta_0$ and an estimated pitch $\theta_t$ at the time point t based on calibration parameters of the camera mounted on the vehicle. Here, the initial pitch $\theta_0$ may be an initial pitch of the camera that has captured the driving image or an initial pitch of the vehicle. A method of estimating the pitch based on the vanishing point by the detecting apparatus will be described in detail with reference to FIG. 4.

In operation 330, the detecting apparatus may update (or correct) the transformation matrix such as a homography matrix based on the estimated pitch variation. The transformation matrix may represent a transformation relation for converting a front-view image obtained during driving into a top-view image. For example, an initial homography matrix based on initial calibration parameters of the camera is assumed to be $H_0$. In this case, the detecting apparatus may reflect the estimated pitch variation on the initial homography matrix $H_0$ to obtain an updated homography matrix $H_t$ based on an equation $H_t=\tilde{H}_t \cdot H_0$. The updated homography matrix may be a homography matrix corresponding to the driving image at time point t.

In one embodiment, the detecting apparatus may obtain an amount of change in the homography matrix based on the estimated pitch variation $\Delta\theta_t$ according to Equation 2 below, and use the amount of change in the homography matrix to obtain the updated homography matrix.

$$\Delta\theta_t \rightarrow R_t$$

$$\tilde{H}_t = K \cdot R_t \cdot K^{-1} \quad (2),$$

where K indicates an intrinsic parameter of a camera or a calibration parameter of the camera, and $K^{-}$ is an inverse value of K.

In operation 340, the detecting apparatus converts the domain of the driving image into the domain of the top-view image based on the updated transformation matrix.

Figure 4:
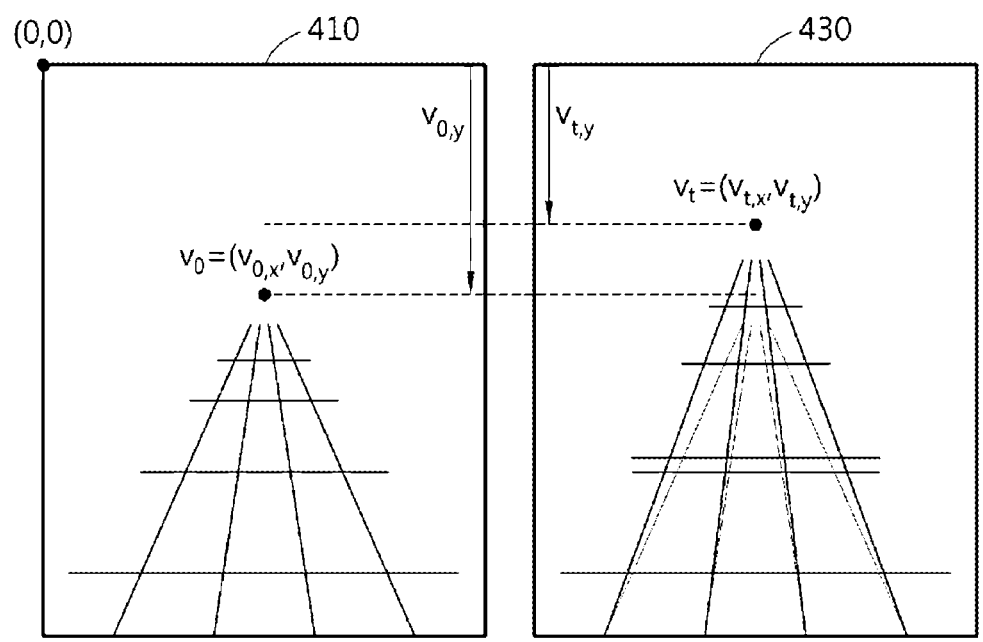
FIG. 4 shows a diagram for explaining a method of calculating a pitch variation according to an embodiment.

FIG. 4 shows a diagram for explaining a method for estimating a pitch variation according to an embodiment.

Referring to FIG. 4, a diagram denoted by 410 illustrates a position $v_0=(v_{0,x},v_{0,y})$ of a vanishing point at time point 0, and a diagram denoted by 430 illustrates the position $v_t=(v_{t,x}, v_{t,y})$ of the vanishing point at time point t.

When the position $v_0=(v_{0,x},v_{0,y})$ of the vanishing point at time point 0 is changed to the position $v_t=(v_{t,x},v_{t,y})$ at time point t, the detecting apparatus may estimate a pitch (or pitch angle) θ at time point t, based on distance information about the vanishing point, that is, a change in a y coordinate of the vanishing point. The detecting apparatus may obtain the pitch at time point t using the distance information about the vanishing point and a calibration parameter of the camera that captures the driving image. For example, the pitch θ at time point t may be obtained by Equation 3 below. The pitch θ at time point t is expressed as $\theta_t$.

$$\theta = \tan^{-1} \frac{v_y - c_y}{f_y}, \quad (3)$$

where, $v_y$ is the y coordinate of the vanishing point detected during driving, $C_y$ is a y coordinate of a principal point, $f_y$ is a focal length of the camera in the y direction, that is, a value represented as the number of pixels in the y direction, and θ is the pitch angle during driving the vehicle. In this case, $C_y$ and $f_y$ are calibration parameters of the camera which may be a value that has been known in advance.

The detecting apparatus may estimate the pitch variation $\Delta\theta_t$ based on a difference between the pitch $\theta_t$ at time point t obtained by Equation 3 and an initial pitch $\theta_0$ at time point 0.

Figure 5:
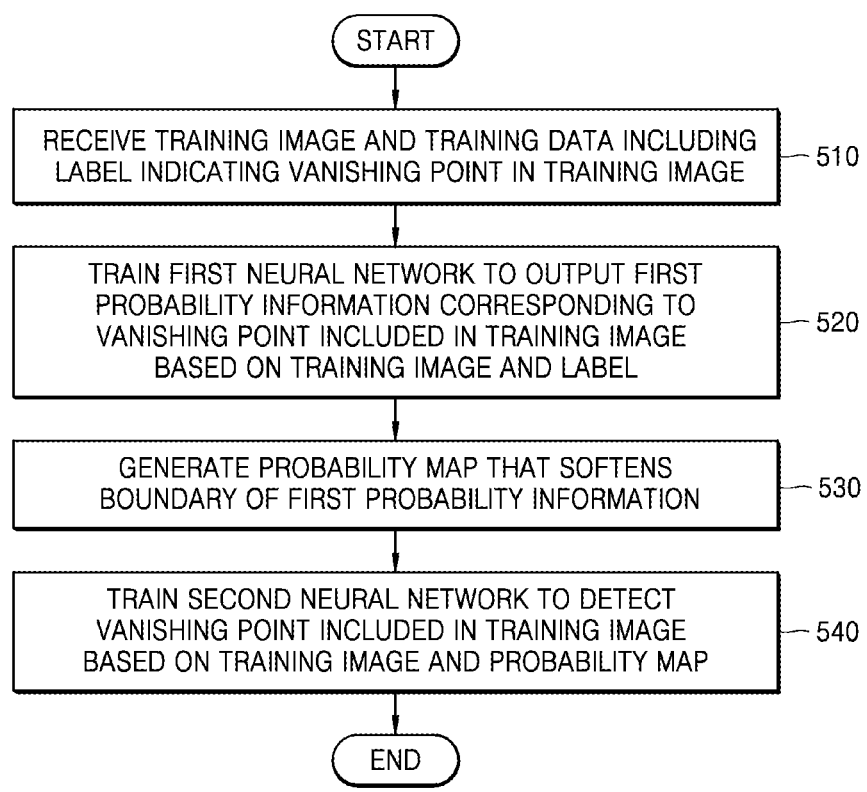
FIG. 5 shows a flowchart illustrating a training method for the detection of a vanishing point according to an embodiment.
Figure 6:
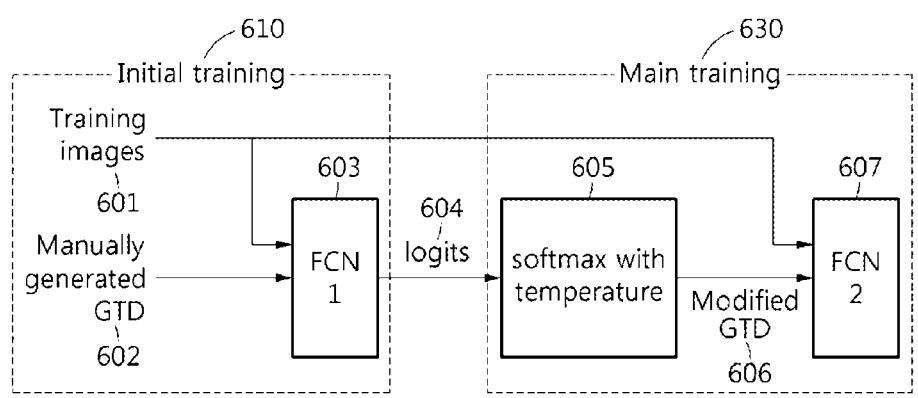
FIG. 6 shows a diagram for conceptual illustration of a training operation according to an embodiment.

FIG. 5 shows a flowchart illustrating a training method for detecting a vanishing point according to an embodiment. FIG. 6 shows a diagram for conceptual illustration of a training operation according to an embodiment.

In operation 510, a training apparatus according to an embodiment receives a training image 601 and training data including a label indicating a vanishing point in the training image. As shown in FIG. 6, the label corresponds to manually generated ground truth data (GTD) 602.

In operation 520, the training apparatus trains a first neural network (FCN 1) 603 to output first probability information about the vanishing point included in the training image 601, based on the training image 601 and the label corresponding to the manually generated GTD 602. The first probability information is probability information about the vanishing point in dimensions included in the training image, and corresponds to a logit 604 shown in FIG. 6. The logit 604 is an output of the FCN 1 603. The logit 604 may be, for example, a matrix having a real value range of X×Y×K. Here, X and Y are vertical and horizontal lengths of the driving image, respectively, and K denotes a component in a depth direction which may be equal to the number of classes of an object to be recognized.

In operation 530, the training apparatus generates a probability map obtained by softening a boundary of the first probability information. The training apparatus may generate the probability map by using a smoothing factor-based regression module, based on the first probability information corresponding to the logit 604. For example, the smoothing factor-based regression module corresponds to a softmax with temperature T 605 shown in FIG. 6. Here, temperature T may be a smoothing factor for softening or smoothing a boundary of a semantic region. The probability map corresponds to a modified GTD 606 shown in FIG. 6.

In operation 540, the training apparatus trains a second neural network (FCN 2) 607 to detect the vanishing point included in the training image, based on the training image 601 and the probability map, that is, the modified GTD 606.

The FCN 1 603 and/or the FCN 2 607 may be, for example, a fully convolutional network (FCN). The operation of the FCN will be described in detail with reference to FIG. 7 below. A method of training the FCN 1 603 and the FCN 2 607 by a training apparatus according to an embodiment will be described in detail with reference to FIG. 8.

In an embodiment, the process of training the FCN 1 603 is referred to as an initial training operation 610 and the process of training the FCN 2 607 is referred to as a main training operation 630.

The initial training operation 610 may include a process of training a first neural network by using correct answer data generated by a manual labeling operation by a user. In this case, a subjective opinion of a specific user may be reflected in a sample of each correct answer data used in the initial training operation. In one embodiment, opinions of many users who make correct answers corresponding to the training data may be reflected on prediction results obtained by training correct answer data selected by users.

In an embodiment, in preparing correct data of semantic segmentation that divides an image into meaningful regions, correct answer data, on which the subjectivities of individual users are less reflected, is constructed, and a pitch of a camera is corrected by using a vanishing point to correctly convert a domain of a driving image into a domain of a top-view image. According to an embodiment, by using a neural network trained through the above process, probability information about a target object (for example, a vanishing point) in a training image may be expressed in each pixel.

The main training operation 630 performs a softmax operation, in which the smoothing factor T (temperate) is introduced in the depth direction with respect to the logit 604, which is an output of the FCN 1 603, to generate new correct answer data (modified GTD) representing a probability information about a target object (for example, a vanishing point) in an input image. In the main training operation 630, the FCN 2 607 for the semantic segmentation may be retrained based on the new correct answer data (modified GTD).

In an embodiment, by performing the main training operation 630, influence of a user's subjective judgment in the labeling process may be reduced and the performance of detecting the vanishing point may be improved.

Figure 7:
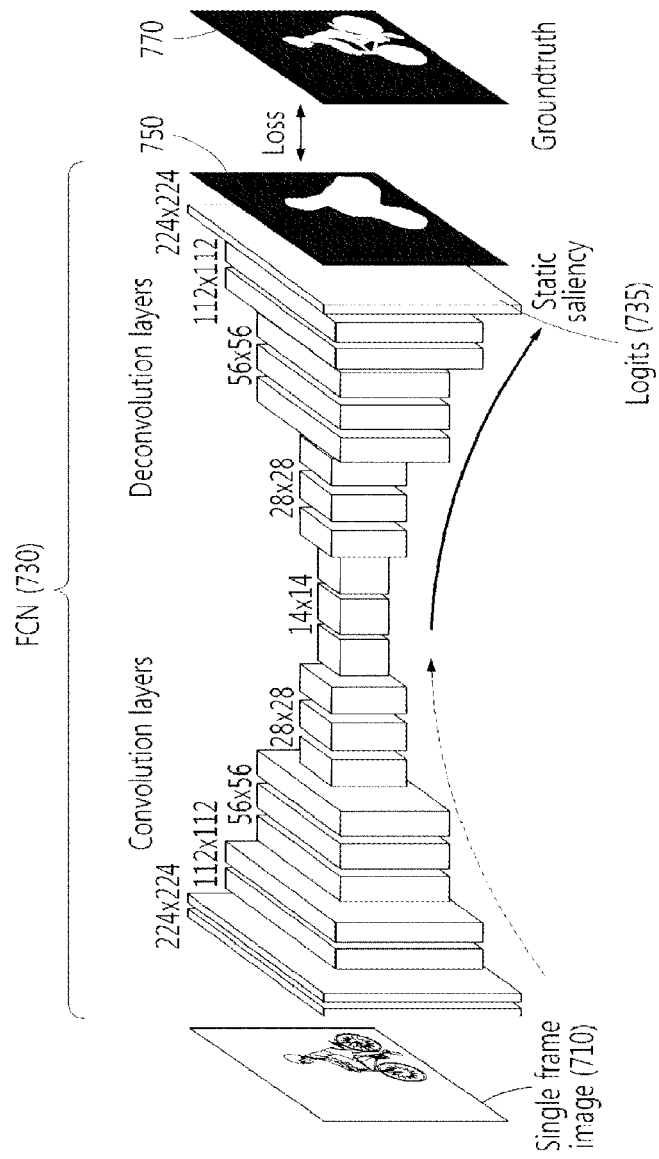
FIG. 7 shows a diagram for explaining a method of operating a neural network, for example, a fully convolutional network (FCN) according to an embodiment.

FIG. 7 shows a diagram for explaining a method of operating a neural network, for example, a fully convolutional network (FCN) according to an embodiment. FIG. 7 illustrates a training operation performed in an FCN 730 when a training image 710 and correct answer data 770 corresponding to the training image are given. The correct answer data 770 may correspond to a label indicating an object to be detected. Hereinafter, correct answer data may also be referred to as a 'label'.

For example, the training image 710 and the correct answer data 770 indicating an object to be detected (for example, a user who is riding a bicycle) are received.

The FCN 730 may output probability information corresponding to an object to be detected from the training image 710, that is, a logit 735, by using convolution layers and deconvolution layers. As described above, the logit 735 corresponds to the probability information about the object in dimensions included in the training image 710. Accordingly, in order to compare the logit 735, which is probability information in dimensions, with the correct answer data 770 corresponding to an image, the logit 735 may be decoded in a form comparable to the correct answer data 770. The decoding process may be performed by, for example, a softmax computing in a softmax layer.

In an embodiment, by applying the smoothing factor T to the softmax operation, a boundary of a semantic region in the logit 735, which is probability information in dimensions, may be softened. The result of applying the smoothing factor to the softmax operation may be understood in connection with FIG. 10.

The FCN 730 may perform training such that a difference between a result 750 obtained through the softmax layers to which the smoothing factor T is reflected and the correct answer data 770, that is, a loss is to be lowered than a preset reference value. This training operation may be performed in the same manner in the FCN 1 603 and he FCN 2 607 in FIG. 6.

Figure 8:
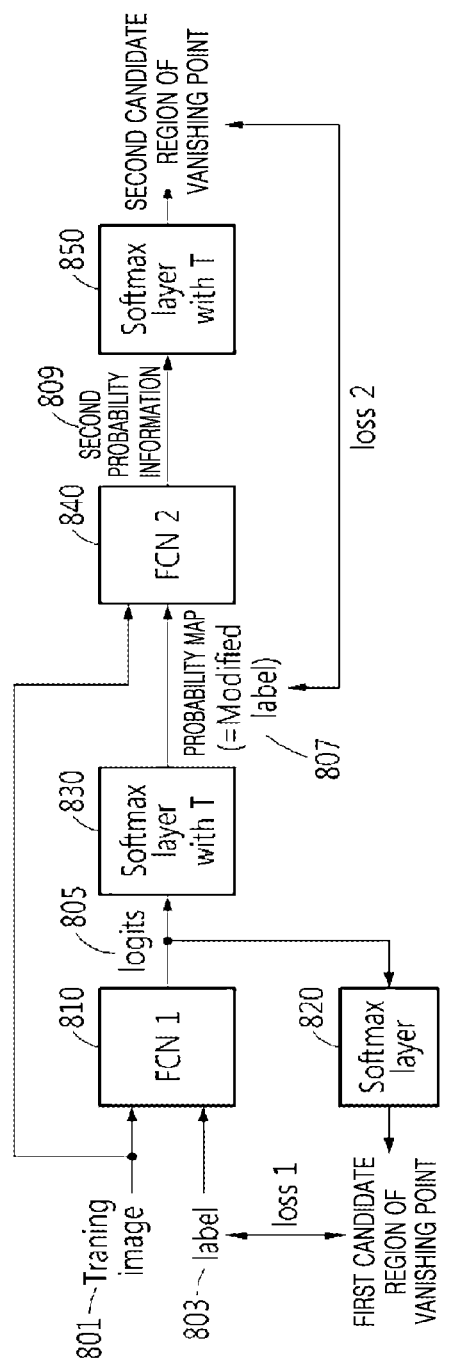
FIG. 8 shows a diagram for explaining a training method according to an embodiment.

FIG. 8 shows a diagram for explaining a training method according to an embodiment. FIG. 8 illustrates an entire training operation of a first neural network (FCN 1) 810 and a second neural network (FCN 2) 840 according to an embodiment.

When a training image 801 and a label 803 are input, the FCN 1 810 may extract first probability information, that is, a logit 805 from the training image 801. An example of the training image 801 is an image 910 shown in FIG. 9, and an example of the label 803 is correct answer data 930 of FIG. 9.

The training apparatus may train a first regression module 820 based on the logit 805. The first regression module 820 may include, for example, a softmax layer. The first regression module 820 may detect a first candidate region of a vanishing point. The first candidate region may include a vanishing point indicated by the label 803. The training apparatus may train the FCN 1 810 such that loss 1 between the label 803 and the first candidate region of the vanishing point which is a detection result of the first regression module 820 is minimized.

At this time, the logit 805 extracted from the FCN 1 810 may be transmitted to a second regression module (softmax layer with T) 830 to apply a smoothing factor. Unlike the first regression module 820, the second regression module 830 may perform a softmax computing to which the smoothing factor is applied.

The second regression module 830 may generate a probability map 807 based on the logit 805. The probability map 807 may correspond to a modified label.

The training apparatus may train the FCN 2 840 that extracts second probability information 809 from the training image 801. In addition, the training apparatus may train a third regression module 850 based on the second probability information 809. The third regression module 850 may detect a second candidate region of the vanishing point. The second candidate region may include vertices indicated by the probability map 807 based on the logit 805.

The training apparatus may train the FCN 2 840 such that loss 2 between the probability map 807 corresponding to a modified label generated in the second regression module 830 and the second candidate region of the vanishing point detected in the third regression module 850 is minimized.

FIG. 9 shows images used for training a first neural network according to an embodiment. Referring to FIG. 9, the image 910 for training and a label indicating a vanishing point to be detected in the image 910, that is, the correct answer data 930 are shown.

Figure 10:
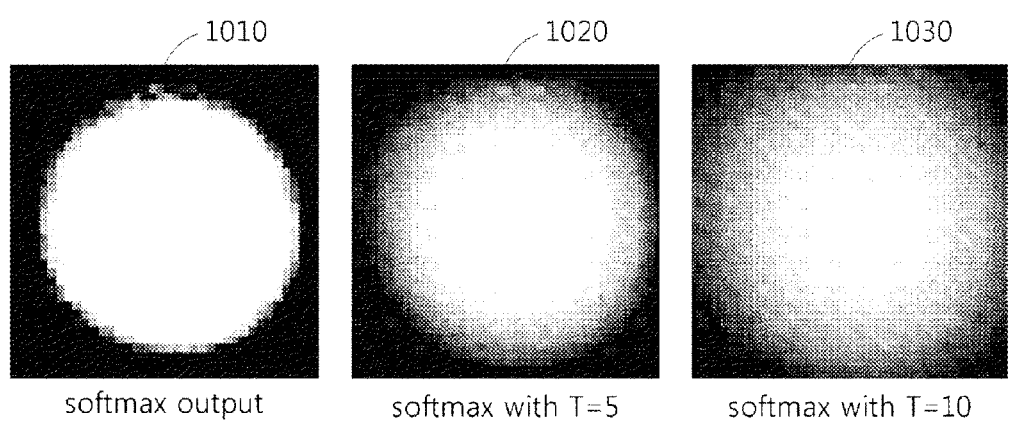
FIG. 10 shows images of the output of a softmax layer changed by a smoothing factor according to an embodiment.

FIG. 10 shows images of an output of a softmax layer changed by a smoothing factor according to an embodiment. Referring to FIG. 10, images 1010, 1020, and 1030 show that probability distribution (probability response) in an area around the vanishing point spreads from 0 to 1 as the value of the smoothing factor changes.

The image 1010 shows that the probability distribution around the vanishing point in a probability map when the smoothing factor T is 1. The image 1020 shows that the probability distribution around the vanishing point in a probability map when the smoothing factor T is 5. The image 1030 shows that the probability distribution around the vanishing point in a probability map when the smoothing factor T is 10. In an embodiment, the greater the value of the smoothing factor, the wider the probability distribution (probability response).

Figure 11:
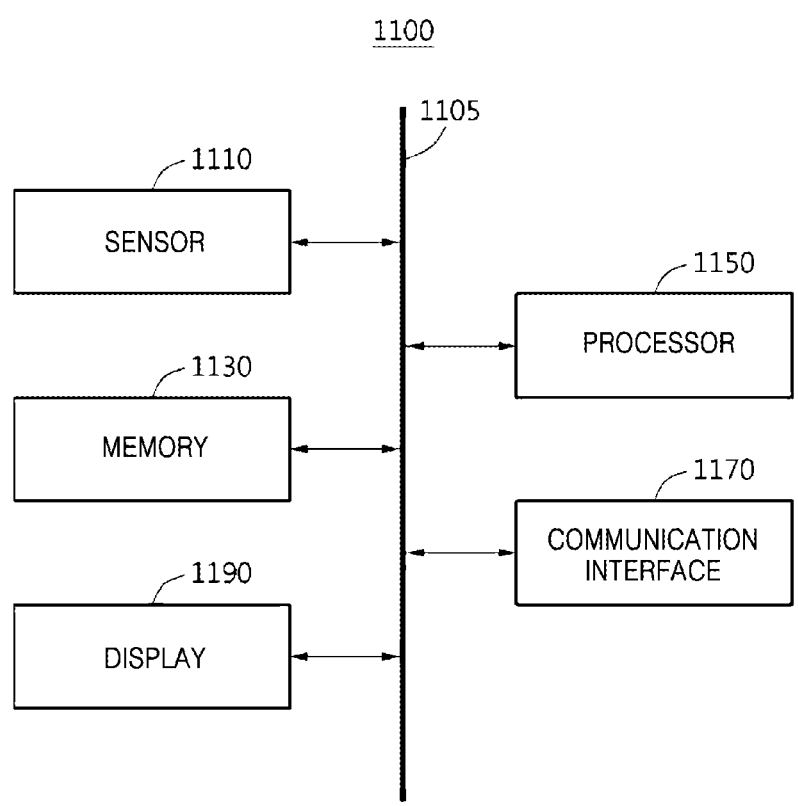
FIG. 11 shows a block diagram illustrating an apparatus for detecting a vanishing point according to an embodiment.

FIG. 11 shows a block diagram illustrating an apparatus 1100 for detecting a vanishing point according to an embodiment. Referring to FIG. 11, the apparatus 1100 according to an embodiment includes a sensor 1110, a memory 1130, and a processor 1150. The apparatus 1100 may further include a communication interface 1170 and a display 1190. The sensor 1110, the memory 1130, the processor 1150, the communication interface 1170, and the display 1190 may communicate with one another via a communication bus 1105.

The sensor 1110 senses a driving image of a vehicle. The sensor 1110 may include, for example, a camera, an image sensor, a vision sensor, and the like, but is not limited thereto. The camera, the image sensor, and/or the vision sensor may be mounted on the vehicle and may capture the driving image in front of the vehicle.

The memory 1130 may store coordinates of a vanishing point detected by the processor 1150 and/or a top-view image generated by the processor 1150. The memory 1130 may be a volatile memory or a non-volatile memory.

The processor 1150 extracts a probability map from the driving image by using a neural network. The processor 1150 detects the vanishing point of the driving image by applying a smoothing factor-based regression to the probability map. The processor 1150 processes a task for driving the vehicle by converting a domain of the driving image based on the detected vanishing point. The processor 1150 may perform at least one method described above in connection with FIGS. 1-10, or an algorithm corresponding to the at least one method. The processor 1150 may execute program codes and control the apparatus 1100 for detecting the vanishing point. The program codes executed by the processor 1150 may be stored in the memory 1130. The processor 1150 may include, for example, a central processing unit (CPU) or a graphics processing unit (GPU).

The communication interface 1170 may receive the driving image captured outside by the detecting apparatus 1100 or information of various sensors received from the outside of the detecting apparatus 1100, map information, and the like. In one or more embodiments, the communication interface 1170 may transmit position information (for example, positional coordinates) about the vanishing point detected by the processor 1150 to the outside of the detecting apparatus 1100 or to the display 1190.

The display 1190 may display the top-view image generated based on positional information about the vanishing point. For example, when the apparatus 1100 is embedded in the vehicle, the display 1190 may be configured as a head-up display (HUD) installed in the vehicle.

Figure 12:
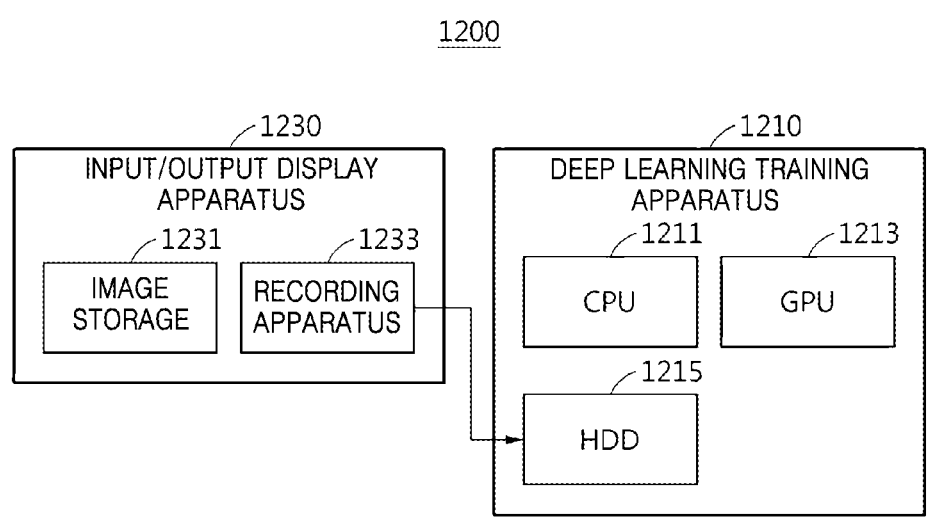
FIG. 12 shows a block diagram illustrating a training apparatus for detecting a vanishing point according to an embodiment.

FIG. 12 shows a block diagram illustrating a training apparatus 1200 for detecting a vanishing point according to an embodiment Referring to FIG. 12, the training apparatus 1200 according to an embodiment may include a deep learning training apparatus 1210 and a display apparatus 1230.

The deep learning training apparatus 1210 may include a CPU 1211, a GPU 1213, and an HDD 1215. The deep learning training apparatus 1210 may be, for example, a training apparatus for calibrating user-created correct answer data with an artificial intelligence algorithm.

The display apparatus 1230 may include an image storage 1231 and a ground truth data (GTD) recording apparatus 1233. The display apparatus 1230 may be a display apparatus capable of inputting and outputting data for generating correct answer data for images stored in the image storage 1231.

The GTD recording apparatus 1233 may store initial correct answer data generated manually by the user. The deep learning training apparatus 1210 may train a neural network (for example, FCN) by using the initial correct answer data stored in the GTD recording apparatus 1233 by using the CPU 1211 and the GPU 1213. The deep learning training apparatus 1210 may store a trained model corresponding to a training result of the neural network on the HDD 1215. The deep learning training apparatus 1210 may generate an output of the neural network for trained data by using a training model in the GPU 1213, and based on the output, may generate a probability map to be used as new correct answer data in the CPU 1211. The new correct answer data is stored in the HDD 1215 and may be re-trained in the deep learning training apparatus 1210.

The embodiments described above may be implemented as hardware components, software components, and/or a combination of hardware components and software components. For example, the apparatus, method, and components described in the embodiments may be implemented by using, for example, one or more computers of the related art or computers for specific purposes, such as a processor, a controller, an arithmetic logic unit (ALU), a digital signal processor, a microcomputer, a field programmable gate array (FPGA), a programmable logic unit (PLU), a microprocessor, or any other apparatus capable of executing and responding to instructions. A processing apparatus may execute an operating system (OS) and one or more software applications driving on the OS. The processing apparatus may also access, store, manipulate, process, and generate data in response to execution of the software. For ease of understanding, the processing apparatus may be described as one processing apparatus, but one of ordinary skill in the art may recognize that the processing apparatus may include a plurality of processing elements and/or plural form of processing elements. For example, the processing apparatus may include a plurality of processors or one processor and one controller. Other processing configurations, including a parallel processor, may be used.

The software may include a computer program, code, instructions, or a combination of one or more of the foregoing, and may be configured to constitute the processing apparatus to operate as desired or to make a command on a processing apparatus independently or collectively. The software and/or data may be, to be interpreted by a processing apparatus or provide instructions or data to the processing apparatus, permanently or temporarily embodied in any type of machine, components, physical apparatuses, virtual equipment, computer storage media or apparatus, or a transmitted signal wave. The software may be distributed over a networked computer system and stored or executed in a distributed manner. The software and data may be stored on one or more computer readable recording media.

Methods according to an embodiment may be implemented in the form of a program instruction that may be executed through various computer means and recorded in a computer-readable medium. The computer-readable medium may include program instructions, data files, data structures, or a combination of these. The program instructions to be recorded on the medium may be those specially designed and configured for embodiments or may be available to those skilled in the art of computer software. Examples of the computer-readable medium include magnetic media such as hard disks, floppy disks, and magnetic tape; optical media such as compact disc read-only memories (CD-ROMs) and digital versatile disks (DVDs); magneto-optical media such as floptical disks; and a hardware apparatus specifically configured to store and execute program instructions such as ROM, random access memory (RAM), flash memory, and the like. Examples of program instructions include machine language code such as those produced by a compiler, as well as high-level language code that may be executed by a computer by using an interpreter or the like. The hardware apparatus described above may be configured to operate as one or more software modules to perform the operations of the embodiments, and vice versa.

While various embodiments have been made in connection with the limited drawings, one of ordinary skill in the art may modify or change these embodiments in various forms with reference to the description provided above. For example, the explained technology may be performed in a sequence that is different from what is described above, and/or the described components, such as system, structure, apparatus, circuit, or the like, may be coupled or combined in a manner that is different from what has been described above, and even when the components are replaced or substituted with other components or equivalents, appropriate results may be obtained. Therefore, other implementations, other embodiments, and equivalents to the claims are also within the scope of the following claims.

What is claimed is:

1. A method of detecting a vanishing point in a driving image of a vehicle, the method comprising:
    receiving the driving image;
    generating a probability map, comprising probability information about each pixel in the driving image being at a position of the vanishing point in the driving image, from the driving image;
    detecting the vanishing point on the driving image by applying smoothing regression, which softens a boundary region of the vanishing point, to the probability map; and
    processing a task for driving the vehicle by converting an orientation of the driving image based on the vanishing point,
    wherein the probability map is generated by using a neural network, and
    wherein the detecting the vanishing point comprises applying an equation below to the probability map, $$p(x, y) = \frac{\exp(l(x, y, k)/T)}{\sum_{k=1}^{K} \exp(l(x, y, k)/T)},$$

where T represents a smoothing factor, l(x, y, k) denotes a logit corresponding to an output of the neural network, x denotes a horizontal length of the driving image, y denotes a vertical length of the driving image, and k denotes a depth of the driving image.

2. The method of claim 1, wherein the detecting the vanishing point comprises detecting a candidate region for the vanishing point as a result of the applying the smoothing regression to the probability map.

3. The method of claim 2, wherein the detecting the vanishing point further comprises:
    determining a centroid of gravity of the candidate region; and
    determining the centroid of gravity as the vanishing point.

4. The method of claim 1, wherein the generating the probability map and the detecting the vanishing point are performed by using a neural network trained to generate a training probability map and a candidate region for a training vanishing point based on a training image and training data indicating the training vanishing point in the training image.

5. The method of claim 1, wherein the probability map comprises information about whether pixels included in the driving image are positioned in a first region corresponding to the vanishing point, a second region not corresponding to the vanishing point, or the boundary region between the first region and the second region.

6. The method of claim 1, wherein the processing the task for driving the vehicle comprises:
    determining a pitch variation of the vehicle or a camera mounted on the vehicle to capture the driving image, based on the vanishing point;
    updating a transformation matrix based on the pitch variation; and
    converting the orientation of the driving image based on the updated transformation matrix.

7. The method of claim 1, wherein the task for driving the vehicle comprises at least one of determining a driving parameter of the vehicle and generating a driving assistant image for the vehicle.

8. A training method for training a neural network, the training method comprising:
    receiving a training image and training data comprising a label indicating a vanishing point in the training image;
    training, based on the training image and the label, a first neural network to output first probability information about each pixel in the training image being at the vanishing point;
    generating a probability map in which a boundary of the vanishing point is softened by using smoothing regression, based on the first probability information; and
    training, based on the training image and the probability map, a second neural network to detect the vanishing point,
    wherein the training the second neural network comprises:
    extracting second probability information from the training image; and
    training, based on the second probability information, a third regression module to detect a second candidate region of the vanishing point, and
    wherein the second candidate region comprises vertices indicated by the probability map based on the first probability information.

9. The training method of claim 8, wherein the training the first neural network comprises:
    extracting the first probability information from the training image; and training, based on the first probability information, a first regression module to detect a first candidate region of the vanishing point, wherein the first candidate region comprises the vanishing point indicated by the label.

10. The training method of claim 8, wherein the generating the probability map is performed by a smoothing factor-based second regression module based on the first probability information.

11. A computer-readable medium storing a computer program for executing in combination with hardware a method in accordance with claim 1.

12. An apparatus for detecting a vanishing point in a driving image of a vehicle, the apparatus comprising:

a sensor configured to detect the driving image of the vehicle; and a hardware processor configured to:

generate a probability map, comprising probability information about each pixel in the driving image being at a position of the vanishing point in the driving image, from the driving image;

apply smoothing factor-based regression, which softens a boundary region of the vanishing point, to the probability map to detect the vanishing point on the driving image; and convert an orientation of the driving image based on the vanishing point, wherein the hardware processor is configured to generate the probability map by using a neural network, and wherein the detecting the vanishing point comprises applying an equation below to the probability map, $$p(x, y) = \frac{\exp(l(x, y, k)/T)}{\sum_{k=1}^{K} \exp(l(x, y, k)/T)},$$

where T represents a smoothing factor, l(x, y, k) denotes a logit corresponding to an output of the neural network, x denotes a horizontal length of the driving image, y denotes a vertical length of the driving image, and k denotes a depth of the driving image.

13. The apparatus of claim 12, wherein the hardware processor is configured to detect a candidate region for the vanishing point as a result of the applying the smoothing factor-based regression to the probability map.

14. The apparatus of claim 13, wherein the hardware processor is further configured to:

determine a centroid of gravity of the candidate region; and determine the centroid of gravity as the vanishing point.

15. The apparatus of claim 12, wherein the probability map comprises information about whether pixels included in the driving image are positioned in a first region corresponding to the vanishing point, a second region not corresponding to the vanishing point, or the boundary region between the first region and the second region.

16. The apparatus of claim 12, wherein the hardware processor is configured to:

determine a pitch variation of the vehicle or a camera mounted on the vehicle to capture the driving image, based on the vanishing point;

update a transformation matrix based on the pitch variation; and convert the orientation of the driving image based on the updated transformation matrix.

17. The apparatus of claim 12, wherein the hardware processor is configured to convert the orientation of the driving image by converting a front view or a side view of the driving image to a top-view of the driving image based on the vanishing point.

* * * * *